United States Patent
Nakhjavani

(10) Patent No.: US 9,418,553 B2
(45) Date of Patent: Aug. 16, 2016

(54) EASY PARKING FINDER

(71) Applicant: Omid B. Nakhjavani, Kirkland, WA (US)

(72) Inventor: Omid B. Nakhjavani, Kirkland, WA (US)

(*) Notice: Subject to any disclaimer, the term of this patent is extended or adjusted under 35 U.S.C. 154(b) by 100 days.

(21) Appl. No.: 14/504,627

(22) Filed: Oct. 2, 2014

(65) Prior Publication Data

US 2016/0098929 A1    Apr. 7, 2016

(51) Int. Cl.
  *G08G 1/14* (2006.01)
  *G06Q 10/02* (2012.01)
  *G06Q 50/30* (2012.01)

(52) U.S. Cl.
  CPC ............ *G08G 1/144* (2013.01); *G06Q 10/02* (2013.01); *G06Q 50/30* (2013.01); *G08G 1/148* (2013.01)

(58) Field of Classification Search
  CPC ......... G08G 1/14; G08G 1/141; G08G 1/144; G08G 1/148
  See application file for complete search history.

(56) References Cited

U.S. PATENT DOCUMENTS

| | | | |
|---|---|---|---|
| 5,910,782 A | 6/1999 | Schmitt | |
| 6,107,942 A * | 8/2000 | Yoo | G08G 1/14 340/468 |
| 6,142,702 A | 11/2000 | Simmons | |
| 6,266,609 B1 * | 7/2001 | Fastenrath | G06Q 30/0284 235/384 |
| 6,285,297 B1 | 9/2001 | Ball | |
| 6,501,391 B1 | 12/2002 | Racunas, Jr. | |
| 7,253,747 B2 | 8/2007 | Noguchia | |
| 7,834,778 B2 | 11/2010 | Browne | |
| 7,893,847 B2 | 2/2011 | Shanbhag | |
| 9,064,416 B1 * | 6/2015 | Foster | G08G 1/005 |
| 2002/0099574 A1 * | 7/2002 | Cahill | G06Q 10/02 705/5 |
| 2003/0074129 A1 * | 4/2003 | Curbow | G01C 21/26 701/523 |
| 2005/0280555 A1 * | 12/2005 | Warner, IV | G08G 1/14 340/932.2 |
| 2006/0250278 A1 | 11/2006 | Tillotson | |
| 2009/0179776 A1 | 7/2009 | Holden | |
| 2010/0302068 A1 * | 12/2010 | Bandukwala | H04W 4/046 340/932.2 |
| 2011/0224899 A1 | 9/2011 | Mathews | |
| 2012/0300073 A1 | 11/2012 | Lai | |
| 2013/0211959 A1 * | 8/2013 | Marusyk | G07B 15/06 705/26.25 |
| 2013/0249711 A1 | 9/2013 | Vellore Sripathi Rao | |
| 2013/0258107 A1 | 10/2013 | Dehbaltov | |
| 2013/0265419 A1 | 10/2013 | Bulan | |
| 2015/0066545 A1 * | 3/2015 | Kotecha | G06Q 10/02 705/5 |
| 2015/0339924 A1 * | 11/2015 | Cook | G08G 1/14 382/104 |

* cited by examiner

*Primary Examiner* — Andrew Bee
(74) *Attorney, Agent, or Firm* — Farid Piroozmandi

(57) ABSTRACT

A driver uses a mobile phone application to transmit a request to a central processor for information on available parking spaces, accommodating a specific size car, close to her present location or a future location.

An image processor processes real time images from linked cameras overlooking parking spaces, comparing them with reference images of unoccupied parking spaces, vehicles including automobiles, bicycles and motorcycles, a no parking sign sandwich board and a traffic cone. The image processor sends the information on available parking spaces to the central processor.

The central processor saves image processor information and information on available parking spaces, parking fee and advertising promotions from parking facilities on a database and transmits a response to the driver's request.

The mobile phone application displays and audio broadcasts the response. The driver pays a fee and reserves an available parking space to exclude it from responses to other requests.

20 Claims, 9 Drawing Sheets

EASY PARKING FINDER

FIELD OF THE DISCLOSURE

The present disclosure relates to systems and methods for identifying an available parking space and reporting of the same, and in particular to a software application on a mobile phone or a computer initiating a request for information on available parking spaces and a detection, data storage and communication system responding to the request.

BACKGROUND OF THE DISCLOSURE

Using a personal automobile for traveling to a destination instead of using public transportation provides convenience, ease of scheduling a trip, and an assurance of timely availability of the automobile for the return trip.

One of the challenges of using a personal automobile is finding an available parking space proximate to the destination. It is often very difficult to find a suitable street parking space in downtown areas, and to find a pay parking garage or parking lot proximate to the destination, a driver has to search driving in downtown traffic when she may have a time constraint as to her destination.

This situation applies whether the driver's destination is a business place down town or a sporting event where a large number of attendees are in search of a limited number of available parking spaces close to their destination. A similar problem also presents itself in parking lots in large universities or large corporations, where a driver needs to attend a class or a meeting starting at a specific time and all the proximate parking spaces are occupied and driver needs to drive through the parking lot to find an available parking space in a timely manner.

A driver can search on the internet and find the address to her destination along with the address to pay parking facilities proximate to her destination before she leaves. However even if the parking facilities provide updated information on availability of parking spaces on their lots, because there is a time lag between when she gets the information from the internet and when she arrives at the parking facility, the parking facility may be fully occupied, where the deriver will again faces the problem of finding an available parking space.

The process for finding an available parking space, usually results in driver's frustration, wasted driver's time, wasted gas or electricity by the automobile driving around in traffic looking for a parking space. In situations where the driver had not allowed for enough driving search time, a delay in finding a parking space will further result in the driver missing the start time of a business meeting, a class, an entertainment or sporting event.

A system that can provide real time information on available parking spaces proximate to the driver's destination will provide the driver with choices to decide where she can park to optimize the distance from the parking space to her destination and associated parking expenses.

SUMMARY OF THE DISCLOSURE

To address solutions to the problem detailed above the present disclosure provides a method, apparatus and system where a plurality of parking spaces is under surveillance by a plurality of above the ground cameras. These cameras provide a plurality of static images or videos to an image processing system comprising hardware and software. The image processing system analyzes the images on a real time bases and provides a report as to availability of specific parking spaces to be stored on a database.

Furthermore, a software application encoded on a memory on a computer comprising hardware and software, or a mobile phone is configured to be activated by a user inquiring about an available parking space proximate to a destination at the time or at a future time, where the real time destination may be the location of the mobile phone and the future time destination may be an address identified by the user. The inquiry is transmitted to a central processing system comprising hardware and software, with access to the database with the stored information on the available parking spaces.

The central processing system then provides a response that is received by the software application including available parking spaces, their location and associated driving direction, and other advertising promotions and cost information associated with available parking spaces in parking facilities.

The central processing system is further configured to keep track of advertising promotions that are transmitted and received by the software application on behalf of the parking facilities to provide the parking facilities with a report on transmissions and associated invoice for such advertisement.

Furthermore, the software application is configured to enable the user to transmit a reservation inquiry to the central processing system, authorizing payment of a fee by the user and precluding the central processing system of transmitting a user selected single specific available parking space location to other inquiring software applications. Upon authorizing of payment of the fee the software application transmits a command to the central processor, and the central processor changes the status of the reserved parking space to one of occupied parking space. The changed status is not updated to one of an available parking space within a predetermined period of time or until the next update of database of available parking spaces, whichever is last.

In one embodiment a method describes encoding a computer program forming a computing platform application on a tangible computer readable medium such as a memory. The application further performs a sequence of functions on a computing platform comprising hardware and software, where the computing platform can include a mobile phone, a tablet, or a personal computer.

The operation of the application includes a user who activates the application to transmit a request for information on a location of an available parking space, including in the request a specific size vehicle as a reference for the requested parking space size. The request also includes a location for the parking space, which is either proximate to a real time location of the computing platform or a future location of the computing platform. The request is sent to a central processor.

The method further describes a system of linked cameras that survey parking spaces off the street and in parking facilities, and capture a plurality of images from the parking spaces and send these images to an image processor. The image processor can process parking space images that are captured in day light, or under limited light, and under clear or adverse atmospheric conditions including rain, fog, or snow.

The image processor compares the parking space images with a series of reference images in a database. The reference images include an unoccupied parking space, images of vehicles including a series of automobiles, bicycles and motorcycles, images of a traffic cone and a no parking sign sandwich board. The image processor then identifies if the parking spaces are occupied or if they are available parking spaces, and provides the information on available parking spaces and their locations to the central processor.

The method further describes that the central processor takes the information from the image processor, and gathers information on further available parking spaces from parking facilities, parking fees, and advertising promotions from these parking facilities, and real time updates a database on available parking spaces. Then the central processor retrieves information on available parking spaces, and advertising promotions from parking facilities, and responds back to the request from the application with the information on available parking spaces.

The method further describes that the application receives the transmitted response including available parking spaces locations, parking facilities' parking fees and advertising promotions, and directions to the available parking spaces. The application then displays and/or audio broadcasts the information on the computing platform.

The method describes that the user further selects an available parking space and the application provides the driving direction to the selected available parking space. User can also reserve an available parking space by authorizing payment of a fee to preclude the central processor to provide the reserved available parking space to any other application inquiry on available parking spaces.

The method describes that upon authorization of payment of reservation fee the application transmits a command to the central processor to change the status of the reserved parking space to an occupied parking space and the status of the reserved parking space is not updated to that of an available parking space within a predetermined period of time or the next update of the database of available parking spaces, whichever is last.

The method describes that the central processor transmits parking facilities' advertising promotions and parking fees when the parking facilities authorize payment of an advertising fee.

The method further describes that the application further provides distance information and an estimated travel time on foot, by a car or a shuttle from a user selected available parking space to the future location of the computing platform that is specified by the user in the request for information on available parking spaces.

In another embodiment a system is described. The system includes a computing platform that can be a mobile phone, a tablet, or a personal computer. The system further includes a computer program including a computing platform application on a tangible computer readable medium such as a memory, where the application performs a sequence of functions on the computing platform.

The system further includes a central processor, a database including data on available parking spaces on a plurality of street sides, in a plurality of parking facilities and associated information including location of the available parking spaces, any associated parking fee, and the parking facilities' advertising promotions. The system further includes a database including images of an unoccupied parking space, images of vehicles including a series of automobiles, bicycles and motorcycles, and reference images of a traffic cone and a no parking sign sandwich board. The system also includes a plurality of linked cameras and an image processor The system further describes that the central processor communicates with the computing platform application, and is also linked to the database that includes information on available parking spaces. System embodiment further details that the central processor communicates with the image processor, and also communicates with a plurality of parking facilities' databases.

The system embodiment describes that the image processor communicates with a plurality of linked cameras that is positioned dominant to a plurality of parking spaces. The image processor also communicates with the database including reference images of an unoccupied parking space, images of vehicles including a series of automobiles, bicycles and motorcycles, and reference images of a traffic cone and a no parking sign sandwich board.

In yet another embodiment a business method is described that provides a driver with real time information on an available parking space. The method provides the driver with a computer program comprising a computing platform application on a tangible computer readable medium for performing a sequence of functions on a computing platform including a mobile phone, a tablet, or a personal computer.

The driver, using the computing platform application, transmits a request for information to a central processor, on location of available parking spaces accommodating a specific size vehicle, proximate to the location of the computing platform or a future location of the computing platform specified by the driver.

The business method further describes an image processor, which receives real time images from parking spaces from a plurality of linked cameras dominating and surveying parking spaces. The image processor compares the parking space images, (which could have been captured in day light, or under limited light, and under clear or adverse atmospheric conditions comprising rain, fog, or snow,) with reference images of an unoccupied parking space, vehicles including automobiles, bicycles and motorcycles, a no parking sign sandwich board and a traffic cone. The image processor identifies if the parking space is occupied by a vehicle, a sandwich board or a traffic cone, or if the parking space is not occupied. The image processor then communicate the location of available parking spaces to the central processor, The business method further details that the central processor updates, on a real time basis, an available parking space database with the information from the image processor and information from parking facilities on available parking spaces and associated information. The central processor then retrieves available parking space information from the available parking space database and transmits a response to the computing platform application request. The transmitted response includes information on real time available parking space off the street and available parking space in a parking facility and associated information including location and direction to the available parking space, parking fee and advertising promotions of the parking facility proximate to the location of the computing platform. The business method indicates that the parking facilities authorize payment of an advertisement fee for inclusion of the advertising promotions of the parking facilities in the transmitted response.

The business method provides for the computing platform application to receive the transmitted response and display and/or audio broadcast the received information on the computing platform. Upon driver's selection of one of the transmitted available parking spaces, the computing platform provides a driving direction to the selected parking space. The computing platform application further provides a distance information and an estimated travel time on foot, by a car or a shuttle from the driver selected available parking space to the future location of the computing platform specified by the driver.

The business method further provides for the computing platform application to enable the driver to reserve a selected available parking space by authorizing payment of a fee, precluding the central processor from transmitting the selected available parking space in response to an inquiry by another computing platform application.

The business method describes that upon authorizing payment of reservation fee the application transmits a command to the central processor to change the status of the reserved parking space to an occupied parking space and the status of the reserved parking space is not updated to that of an available parking space within a predetermined period of time or the next update of the database of available parking spaces, whichever is last.

In a further embodiment a method for surveillance of a parked car is disclosed. This method provides for a surveillance camera surveying a plurality of the parked cars, where the surveillance camera is configured to zoom in on a license plate of each of the parked cars. A database is then populated with a location and a time stamp relating to the plurality of parked cars with a designator comprising a license plate number of each parked car and an associated image of the parked car. The database information is periodically updated on a preset time intervals.

The surveillance method further provides for a website where a user can access the database and check upon her car. The surveillance method further enables the database to send an email or a text message to a web address, an email address, or a telephone number associated with a designator on a specific parked car, when the car is no longer present or the car has moved in situ, signaling an alert as to the parked car situation.

The features, functions, and advantages that have been discussed can be achieved in various embodiments or may be combined in yet other embodiments further details of which can be seen with references to the following description and drawings.

BRIEF DESCRIPTION OF THE DRAWINGS

Further features of the present disclosure are set forth in the detailed description and in the drawings figures. Referring to the drawings in which like reference numbers represent corresponding parts throughout.

Figure 1:
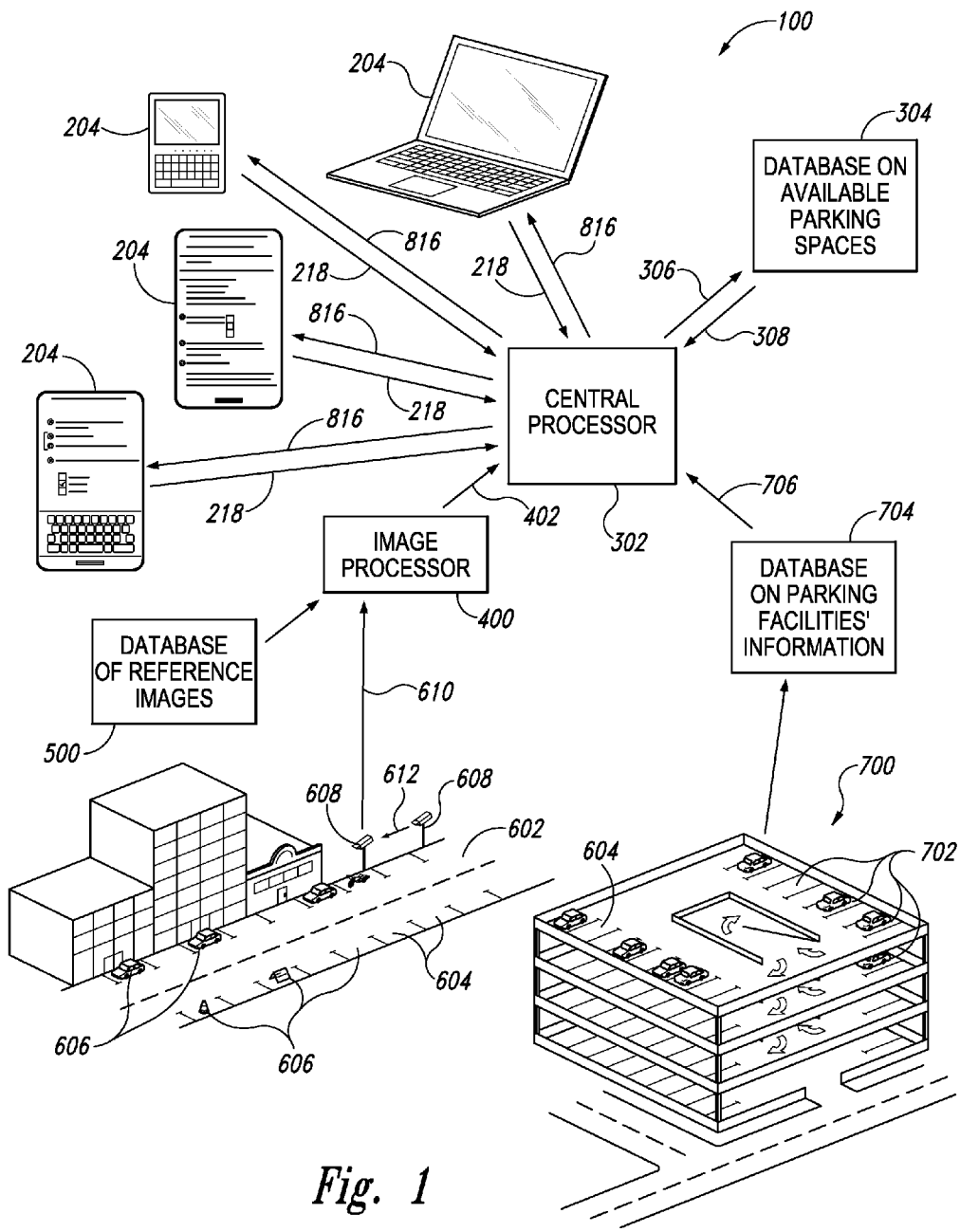
FIG. 1 is an illustration of overall Easy Parking Finder systems.

Each figure shown in this disclosure shows a variation of an aspect of the embodiments presented, and only differences will be discussed in detail.

DETAILED DESCRIPTION

Generally the present disclosure describes a software application titled Easy Parking Finder, that is a computer program encoded on a on a tangible computer readable medium for performing a sequence of functions on a computing platform including a mobile phone, a tablet, or a personal computer, functioning to assist a driver in finding an available parking space close to her destination.

The destination most often is the real time location of the computing platform that the driver uses to run the Easy Parking Finder application, such as driver's mobile phone which runs the application, or it may be a future destination that the driver plans to drive to, such as an airport, a sporting event in a stadium, a shopping center or a business meeting down town, and the driver is trying to find a close available parking space in advance, so that when she gets to her destination she can directly go to the parking space and park her car without having to drive around in search of a close-by available parking space.

Driver uses the Easy Parking Finder application to specify the size of her vehicle and the location where she want a parking space, and transmits a request for the available parking space to a central processor.

The central processor searches a database that contains location of available parking spaces and associated information with the available parking spaces, and selects a number of available parking spaces that are closest to the driver specified location and transmits a response with the information to the computing platform that initiated the request.

The database of available parking spaces is continuously updated on a real time bases by the same central processor. The central processor is in communication with both a database of parking spaces in parking facilities, and an image processor. The image processor in turn is in communication with linked surveillance cameras that provide images of parking spaces on street sides and from parking lots to the image processor.

The image processor receives the real time captured images from the surveillance cameras. These captured images may be taken in day time or under low light, on a clear day or under adverse atmospheric conditions such as fog, rain or snow. The adverse atmospheric condition causes a variation of image pixels depending on fog, rain drops or snow flake images and the image processor can filter the altered pixels and recognize a substantially clear image of the captured image of the parking space.

The image processor then compares the images of the parking spaces with a set of reference images hosted on a database of reference images. The reference images include images of unoccupied parking spaces, images of vehicles including different automobiles, trucks, bicycles and motorcycles, in addition to reference images of no parking sign sandwich boards and traffic cone. The image processor identifies if a parking space is occupied by a vehicle including an automobile, bicycle or a motorcycle, a no parking sign sandwich board or a traffic cone or if the parking space is otherwise unoccupied and is an available parking space.

The image processor then transmits the location of available parking spaces to the central processor. The central processor uses the information from the image processor and the parking facilities to update the database of available parking spaces. As indicated above the central processor uses the information from the database on available parking spaces to provide a response to the request for available parking spaces.

Once the computing platform receives the transmitted response from the central processor, the location of available parking spaces is displayed on the computing platform and audio broadcasted. The parking facilities, by paying an advertisement fee, can arrange for the information on their parking spaces to further include address of their facility, parking fee and advertisement promotions to be transmitted to and displayed by the Easy Parking Finder application for the benefit of a driver searching for a parking space close to the parking facility.

The driver can select one of the available parking spaces provided by the response from the central processor and application will display a driving direction to the selected available parking space. The application will further display a distance and time that it will take the driver to go from the selected parking space to her destination that she had specified in advance, either on foot, by a car or a shuttle. The walking distance and time provides information to the driver as to how much time it will take her to get to her meeting location from where she will park her car. The shuttle or car travel time and distance is usually applicable when a driver needs a parking location close to an airport and needs to know how much time she needs to allow for a shuttle to take her from the off airport parking facility to the airport terminal.

The driver can further reserve her selected available parking space by authorizing payment of a fee through the Easy Parking Finder. This reservation will preclude the central processor from including the reserved selected parking space in responses to other drivers requesting an available parking space proximate to the reserved selected parking space.

Upon authorizing payment of reservation fee the Easy Parking Finder application transmits a command to the central processor to change the status of the reserved parking space to an occupied parking space and the status of the reserved parking space is not updated to that of an available parking space within a predetermined period of time or the next update of the database of available parking spaces, whichever is last.

A further application that can be available to a driver using a system that includes a group of linked cameras surveying a parking space and an image processor in communication with the cameras and an internet service provider and webpages, is to enable a driver to check on her parked car.

A group of linked camera can survey a parking lot and take images of the parked cars and their license plates. The images of the cars and their license plates are provided to an image processor which identifies the license numbers and designates each parked car with its license plate number and its parked location. This information is then provided and available on a website, where a driver can check on her car by viewing the image of her parked car on a website. The image processor can further be enabled to transmit a text message or an email to a subscriber associated with a designated car when an updated image of the designated parking space shows an insitu displacement of the parked car, in case of an accident affecting the parked car, or absence of the parked car, in case of an unauthorized movement of the parked car.

Referring to FIG. 1, the overall hardware systems 100, and general functions comprising the Easy Parking Finder application 202 are detailed. The computing platforms 204 including mobile phone, tablet or personal computer are shown with the Easy Parking Finder application 202 encoded on an onboard tangible computer readable medium in communication with a central processor 302. Where the computing platforms 204 transmit 218 request 214 for available parking spaces 604 to the central processor 302 and the central processor 302 transmits responses 816 back to the computing platforms 204.

The central processor 302 in turn is in communication with the database on available parking spaces 304, both updating 306 the database on a real time basis with available parking space locations and associated information, and searching 308 the database on available parking spaces 304 for information to provide a response to the computing platform 204 requests 214 for available parking spaces.

The central processor 302 is further in communication 402 with an image processor 400 and a database on parking facilities available parking spaces 704. The central processor gets information on available parking spaces 604 from the image processor 400 and the database on parking facilities available parking spaces 704 to update the database on available parking spaces 304 on a real time basis.

FIG. 1 further shows that the information on database on parking facilities available parking spaces 704 is based on the information from the parking facility 700 including available parking spaces 604 from a plurality of parking spaces 702 in the parking facility 700. The database on parking facilities available parking spaces 704 further includes information on parking fee and advertisement promotions of the parking facility.

FIG. 1 also shows a street 602 with a plurality of street side parking spaces 606 including available parking spaces 604, and a plurality of linked surveillance cameras 608 dominating the parking spaces 606. The linked cameras 608 capture images of the plurality of parking spaces 606 and transmit 610 the images to the image processor 400. The image processor 400 compares the linked camera 608 images of the parking spaces 606 with reference images 510 from a database of reference images 500 to identify the available parking spaces 604 that are not occupied by vehicles including automobiles 502 and bicycles and motorcycles 504 or no parking sign sandwich board 506 or traffic cone 508.

Figure 2:
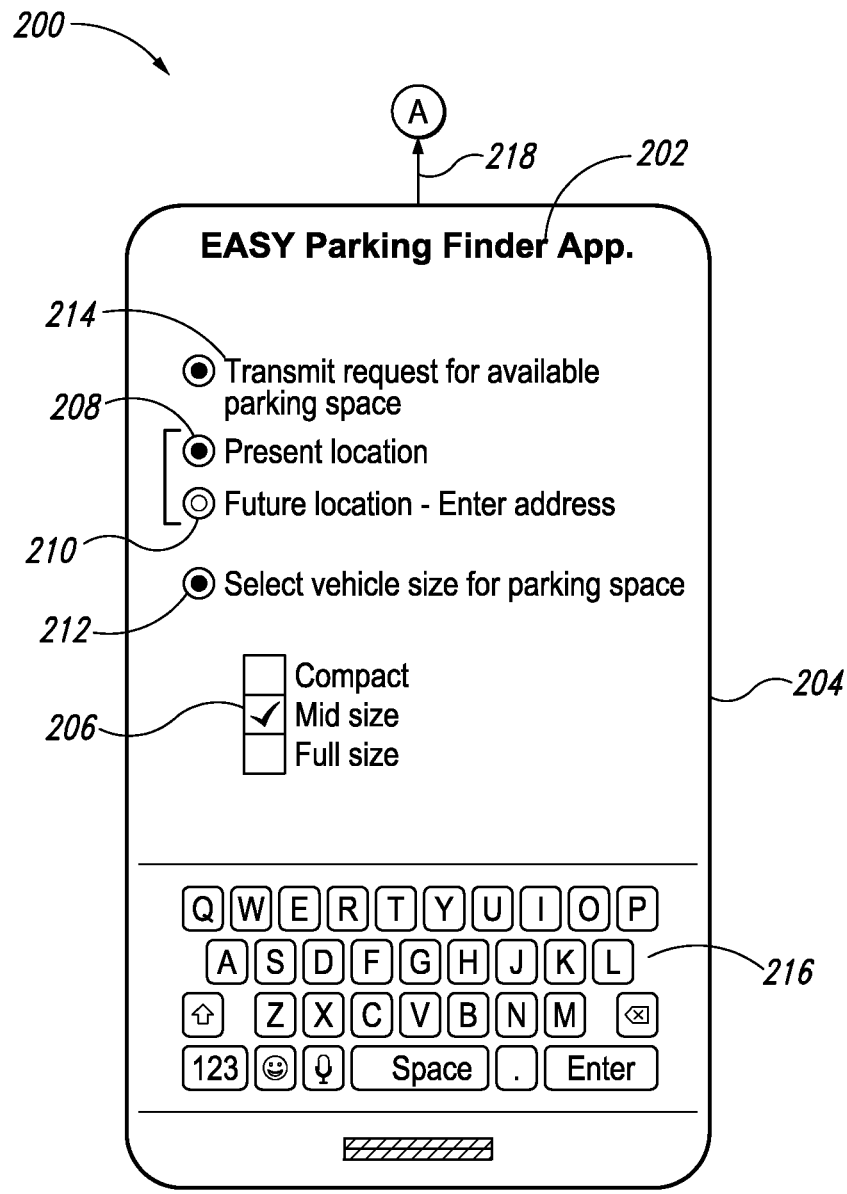
FIG. 2 is an illustration of computing platform, transmitting a request for an available parking space, sample screen, in communication with central processor.

Referring to FIG. 2, a computing platform 204 is shown along with the Easy Parking Finder application 202 request transmitting display 200. The display illustrates the activating button for transmitting a request 214 for an available parking space. The computing platform 204 glass display buttons are touch screen virtual display buttons in the present illustrations, other embodiments may use physical buttons.

The display further illustrates the button identifying the location 208, 210, where the available parking space 604 is requested. One button identifies a present location 208 of the platform. This location is provided to the Easy Parking Finder application 202, either by a triangulation of cellular towers identifying the location 208 of the computing platform 204 when the computing platform comprise a mobile phone, or in other situation if a global positioning system (GPS) is available on the computing platform. The GPS will locate the present location 208 of the computing platform 204. There are other methods also available for locating a computing platform such as using radio frequencies emitting from radio station. In situations where the computing platform also has a map application such as a GOOGLE MAP, YAHOO MAP or other map applications, the Easy Parking Finder application 202 may get input as to the location 208 of the computing platform 204 using the map application.

A second button is provided on the Easy Parking Finder application 202 display for specifying a future location 210 of the computing platform 204 as the location where the available parking space is requested. A driver or user upon selecting this future location 210 button will enter the address of the future location using a key board 216 on the computing platform 204. The keyboard 216 may be a displayed key board or it may be a physical keyboard with buttons.

The Easy Parking Finder application 202 display further provides a button where the driver or user can select the vehicle size 212 for the available parking space from choices of compact, midsize, or full size 206.

A driver or user after activating the Easy Parking Finder application 202 will provide a location 208, 210 where the available parking space is requested. She will then select the size of the vehicle 212 that will be parked at the available parking space 604 and then will transmit 218 the request 214 for an available parking space. The computing platform 204 transmits 218 the request 214 for an available parking space to a central processor 302.

Figure 3:
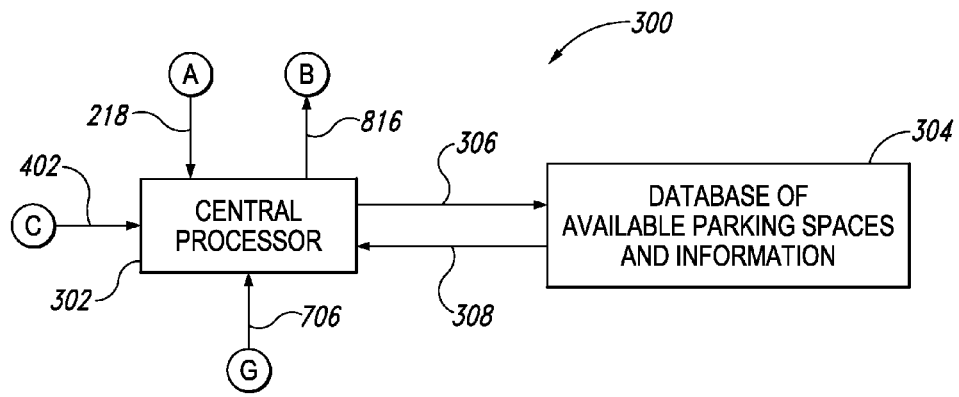
FIG. 3 is an illustration of central processor in communication with database of available parking spaces, image processor and computing platform.

Referring to FIG. 3, where central processor 302 overall connections 300 are illustrated, a central processor 302 is shown in communication with a database of available parking spaces 304. After receiving 218 a request 214 for an available parking space the central processor 302 will search 308 the database of available parking spaces 304 for the suitable available parking spaces 604 to respond 816 back to the Easy Parking Finder application 202. The central processor 302 also populate 306 the database of available parking spaces 304 with updated list of available parking spaces 604 that are provided 402, 706 to the central processor 302 from the image processor 400 and parking facility database 704 on available parking spaces in parking facilities 700 along with relevant information including parking fee and parking facilities advertisement promotions.

Figure 4:
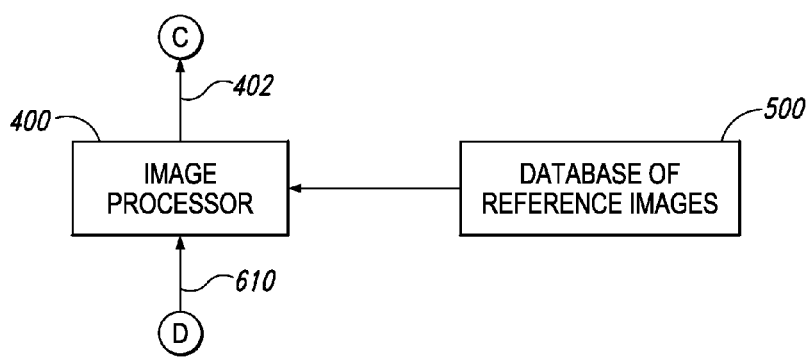
FIG. 4 is an illustration of image processor in communication with database of reference images and central processor.

Referring to FIG. 4, an image processor 400 is shown in communication with a database of reference images 500, and in communication 610 with linked cameras 608, and further in communication 402 with the central processor 302.

The linked cameras 608 transmit 610 a plurality of images of parking spaces 606 to the image processor 400. The image processor compares the linked camera 608 images with reference images 510 from the database on reference images 500. The reference images 510 comprise reference images of unoccupied parking spaces 512, vehicles including automobiles 502, bicycles and motorcycles 504, no parking sign sandwich board 506, and traffic cone 508.

The image processor 400 identifies which one of the parking spaces 606 is not occupied by a vehicle including an automobile 502 or a bicycle or motorcycle 504, a no parking sign sandwich board 506, or a traffic cone 508. The information on unoccupied parking spaces will be transmitted 402 to the central processor 302 as available parking spaces 604.

Figure 5:
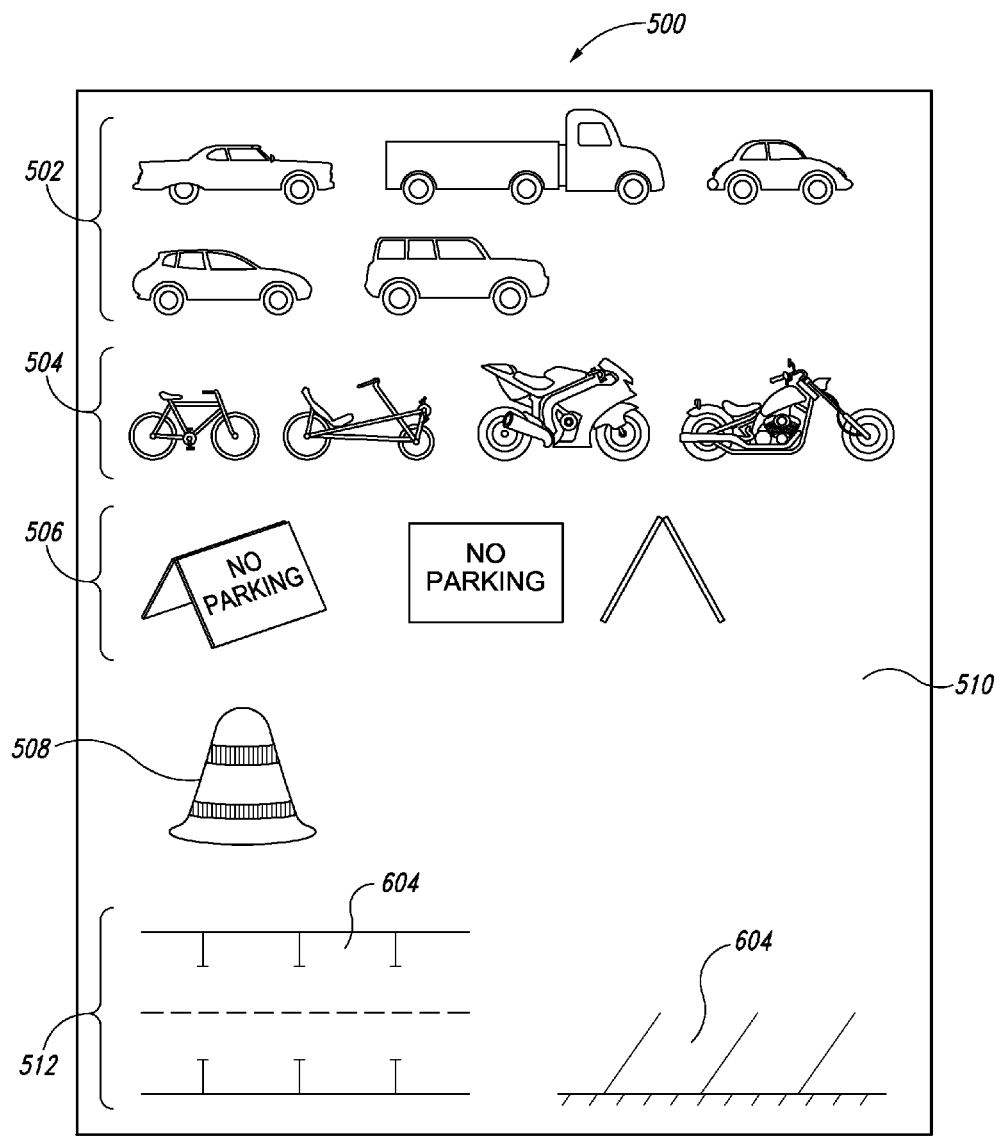
FIG. 5 is an illustration of database of reference images of vehicles including automobiles, bicycles and motorcycles, no parking sign sandwich board and traffic cone.

Referring to FIG. 5, the database of reference images 500 is illustrated. The data in the database of reference images 500 comprise reference images 510 including a plurality of reference images on unoccupied parking spaces 512, a plurality of reference images of vehicles including automobiles 502 and bicycles and motorcycles 504, reference images of no parking sign sandwich board 506, and reference image of a traffic cone 508.

Figure 6:
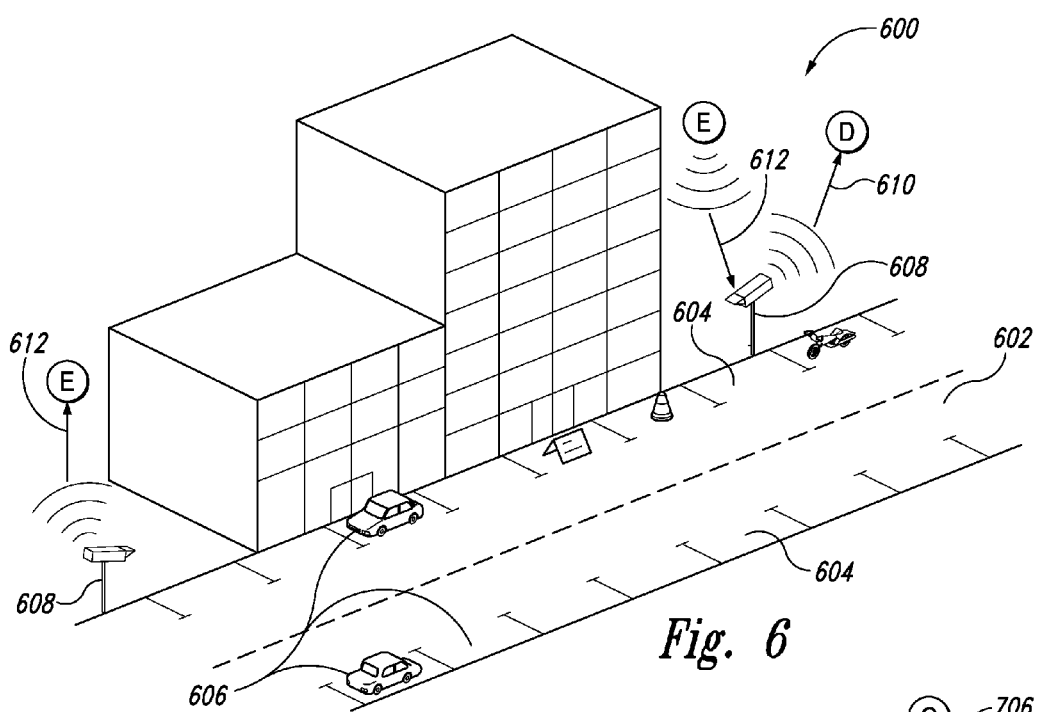
FIG. 6 is an illustration of side street parking spaces and dominating surveying linked cameras.

Referring to FIG. 6, where street side parking 600 is illustrated, a street 602 is shown with a plurality of parking spaces 606 along the side of the street on both sides of the street. Among the parking spaces 606 some are shown to be occupied by automobiles, motorcycles, no parking sign sandwich board and also a traffic cone. The parking spaces 606 further include some available parking spaces 604 that are not occupied.

FIG. 6 further illustrate a plurality of linked 612 cameras 608 dominating the parking spaces 606 and transmitting 610 the captured images from the parking spaces 606 to the image processor 400 (not shown). The linked cameras 608 capture images during day light or limited lighting conditions. The camera further capture images of the parking spaces 606 during clear weather or under adverse atmospheric conditions including fog, rain, or snow.

The captured images during adverse atmospheric conditions provide different image pixel colors depending on fog, rain or snow on a localized bases or the overall image. The image processor 400 can distinguish the perturbing colored pixels and identify presence of an automobile 502, a bicycle or a motorcycle 504, a no parking sign sandwich board 506, or a traffic cone 508 on the parking spaces 606 to determine an available parking space 604 that is not occupied.

Figure 7:
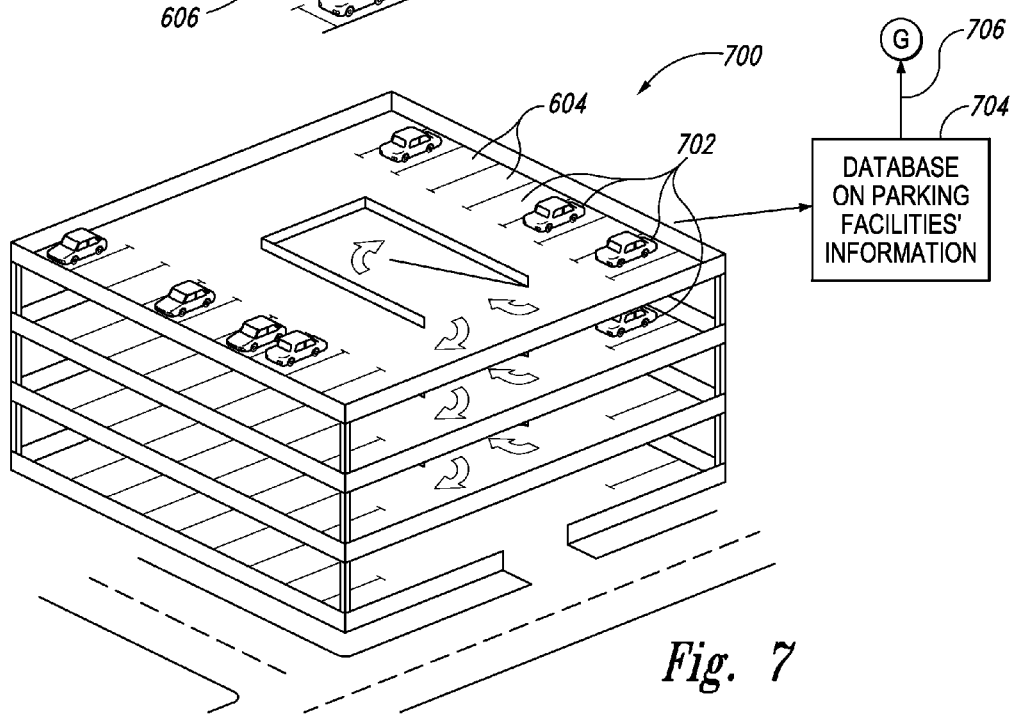
FIG. 7 is an illustration of a parking facility.

Referring to FIG. 7, a parking facility 700 with a plurality of parking spaces 702 is shown along with a parking facility database 704. The parking facility database 704 includes data on available parking spaces 604 in the parking facility 700 and associated information including parking fee and advertisement promotions of the parking facility. Upon parking facility 700 authorizing payment of an advertisement fee to the central processor 302, the parking fee and advertisement promotions of the parking facility 700 will be included in the central processor 302 response to the request 214 for available parking spaces 604 by the Easy Parking Finder application 202. This provides for an advertising venue for the parking facility 700, where the parking facility 700 can advertise their promotions to drivers who are seeking an available parking space 604 close to the parking facility 700.

The data in the parking facility database 704 is regularly updated by the parking facility and upon inquiry by the central processor 302 this information is transmitted 706 to the central processor 302.

Figure 8:
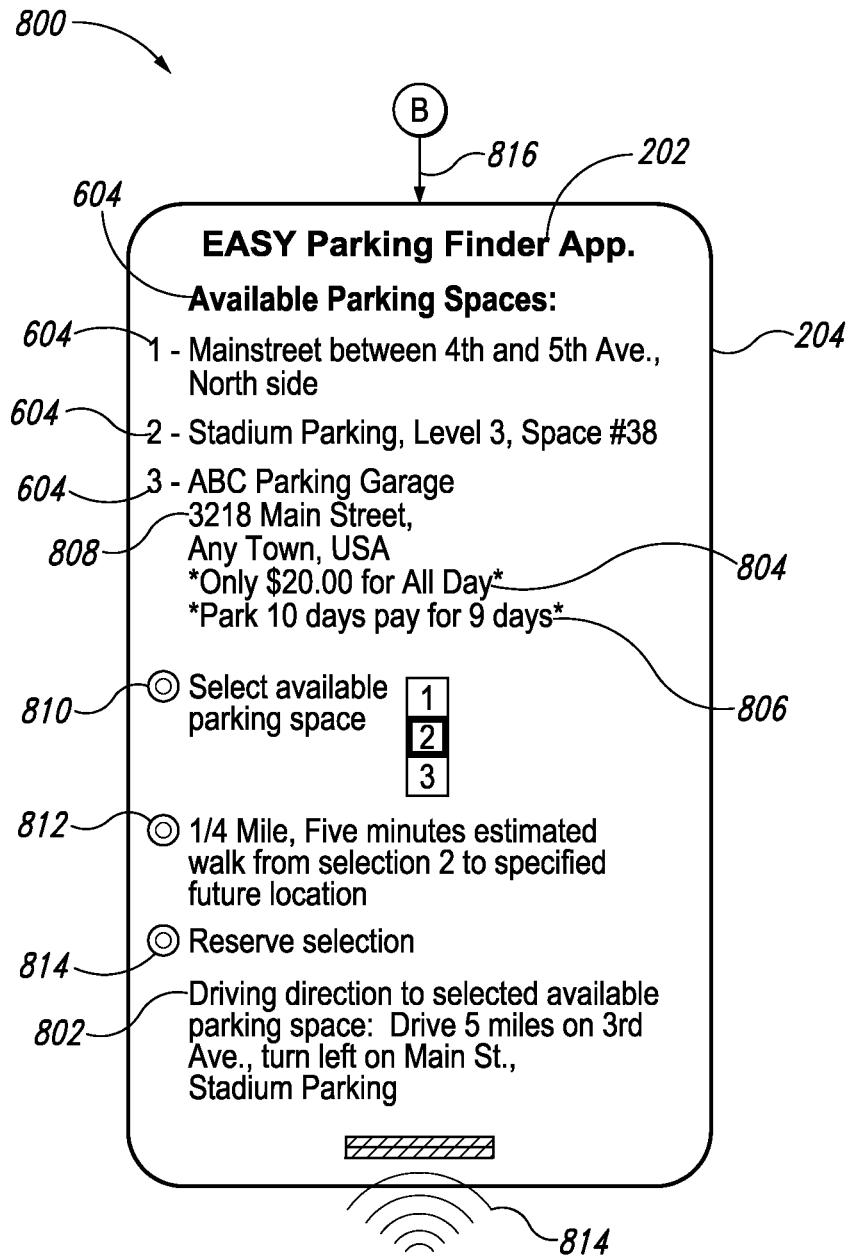
FIG. 8 is an illustration of computing platform, receiving transmitted response on available parking spaces, sample screen, displaying information on available parking spaces, in communication with central processor.

Referring to FIG. 8, a computing platform 204 is shown along with the Easy Parking Finder application 202 received response display 800. The display 800 illustrates the transmitted 816 response of the central processor 302 to the Easy Parking Finder application 202, showing a list of available parking spaces 604. The list of available parking spaces 604 may be on the street side, in a parking lot, or in a parking facility 700. The information on available parking spaces 604 in a parking facility may further include an associated parking fee 804, the address of the parking facility 808 and parking facility advertisement promotions 806. The Easy Parking Finder application 202 further provides for an audio broadcast 814 of the available parking spaces 604.

The Easy Parking Finder application 202 received response display 800 further provides buttons for selecting 810 an available parking space 604. Upon selecting 810 of one of the available parking spaces 604 the Easy Parking Finder application 202 provides a driving direction 802 to the selected available parking space 604. In situation where the driver or user had specified a future location 210 for requesting 214 an available parking space 604, the Easy Parking Finder application 202 will further provide a distance and estimated travel time 812 on foot, by a car or shuttle from the selected 810 available parking space 604 to the specified future location 210.

The distance and estimated travel time 812 information feature is usually applicable when a driver or user transmits a requests for an available parking space 604 before she is at her final destination or before she starts driving to her destination, where the destination is an airport, a train or bus station, or a meeting location when a specific time appointment needs to be met.

The Easy Parking Finder application 202 further provides a button for reserving 814 a selected available parking space 604. By reserving 814 a selected parking space 604 the driver authorizes payment of a fee, and Easy Parking Finder application 202 transmits a command to the central processor 302. The command identifies the reserved 814 available parking space 604 to the central processor 302 to exclude the information of that parking space from central processor's 302 responses 816 to other Easy Parking Finder application 202 requests 214 for available parking spaces 604. Once the central processor 302 receives the reservation 814 command it will change the status of the reserved parking space to an occupied parking space. The status of the reserved parking space is not updated to a status of an available parking space 604 within a predetermined time period, or until the next update of the database of available parking spaces, whichever is last.

Figure 9:
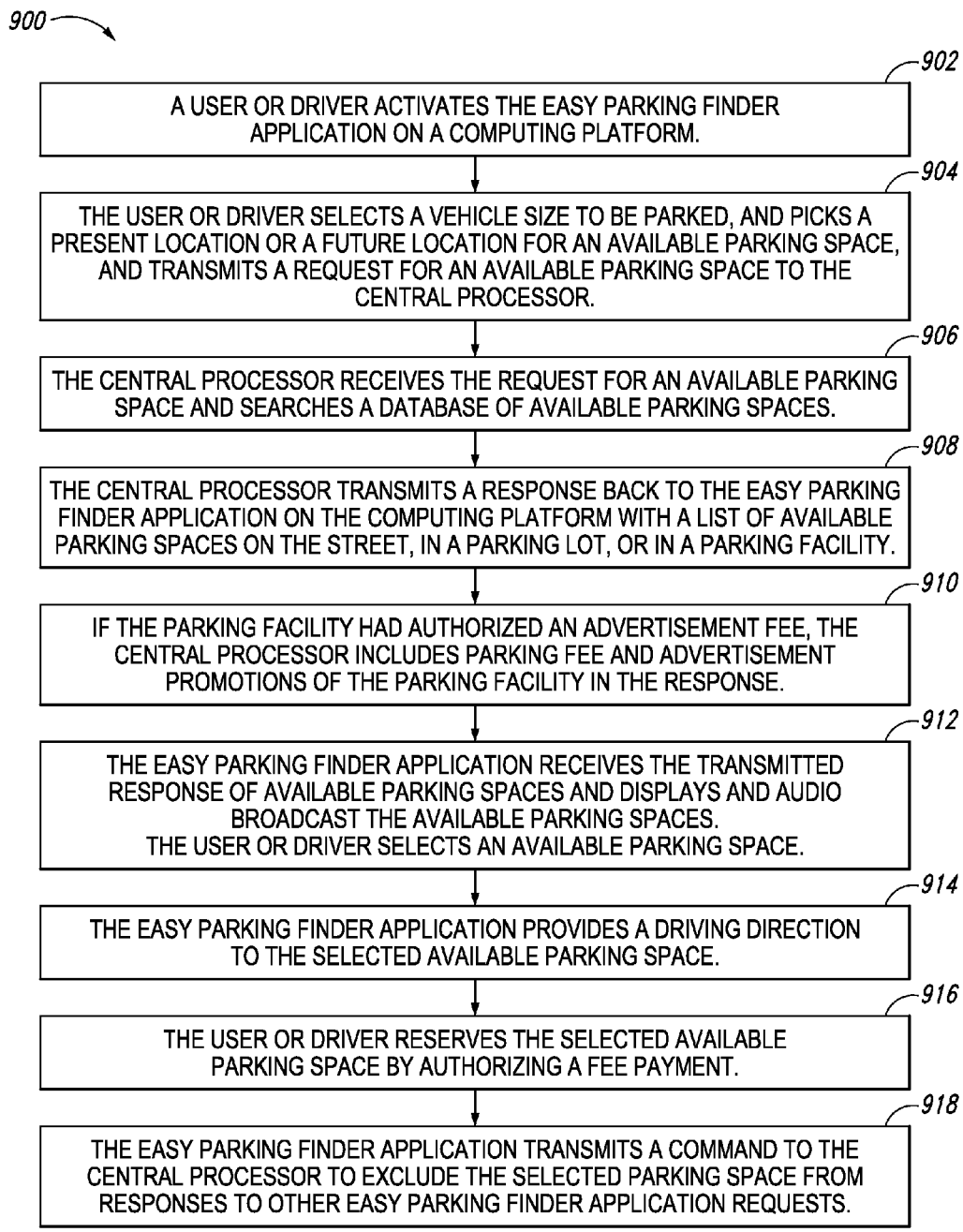
FIG. 9 is an illustration of sequence of operations of Easy Parking Finder application and central processor.

Referring to FIG. 9, the sequence of functions and steps 900 carried out by the Easy Parking Finder application 202 and the central processor 302 in present disclosure is detailed.

In step 902 a user or driver activates the Easy Parking Finder application 202 on a computing platform 204.

In step 904 the user or driver selects a vehicle size 212 to be parked, and picks a present location 208 or a future location 210 for an available parking space 604, and transmits 218 a request 214 for an available parking space 604 to the central processor 302.

In step 906 the central processor 302 receives the request 214 for an available parking space 604 and searches 308 a database of available parking spaces 304.

In step 908 the central processor 302 transmits a response 816 back to the Easy Parking Finder application 202 on the computing platform 204 with a list of available parking spaces 604 on the street 602, in a parking lot, or in a parking facility 700.

In step 910 if the parking facility 700 had authorized an advertisement fee, the central processor 302 includes parking fee and advertisement promotions of the parking facility 700 in the response 816.

In step 912 the Easy Parking Finder application 202 receives the transmitted response 816 of available parking spaces 604 and displays 800 and audio broadcast 814 the available parking spaces 604. The user or driver selects 810 an available parking space 604.

In step 914 the Easy Parking Finder application 202 provides a driving direction 802 to the selected 810 available parking space 604.

In step 916 the user or driver reserves 814 the selected 810 available parking space 604 by authorizing a fee payment.

In step 918 the Easy Parking Finder application 202 transmits a command to the central processor 302 to exclude the selected 810 parking space from responses 816 to other Easy Parking Finder application 202 requests 214.

Figure 10:
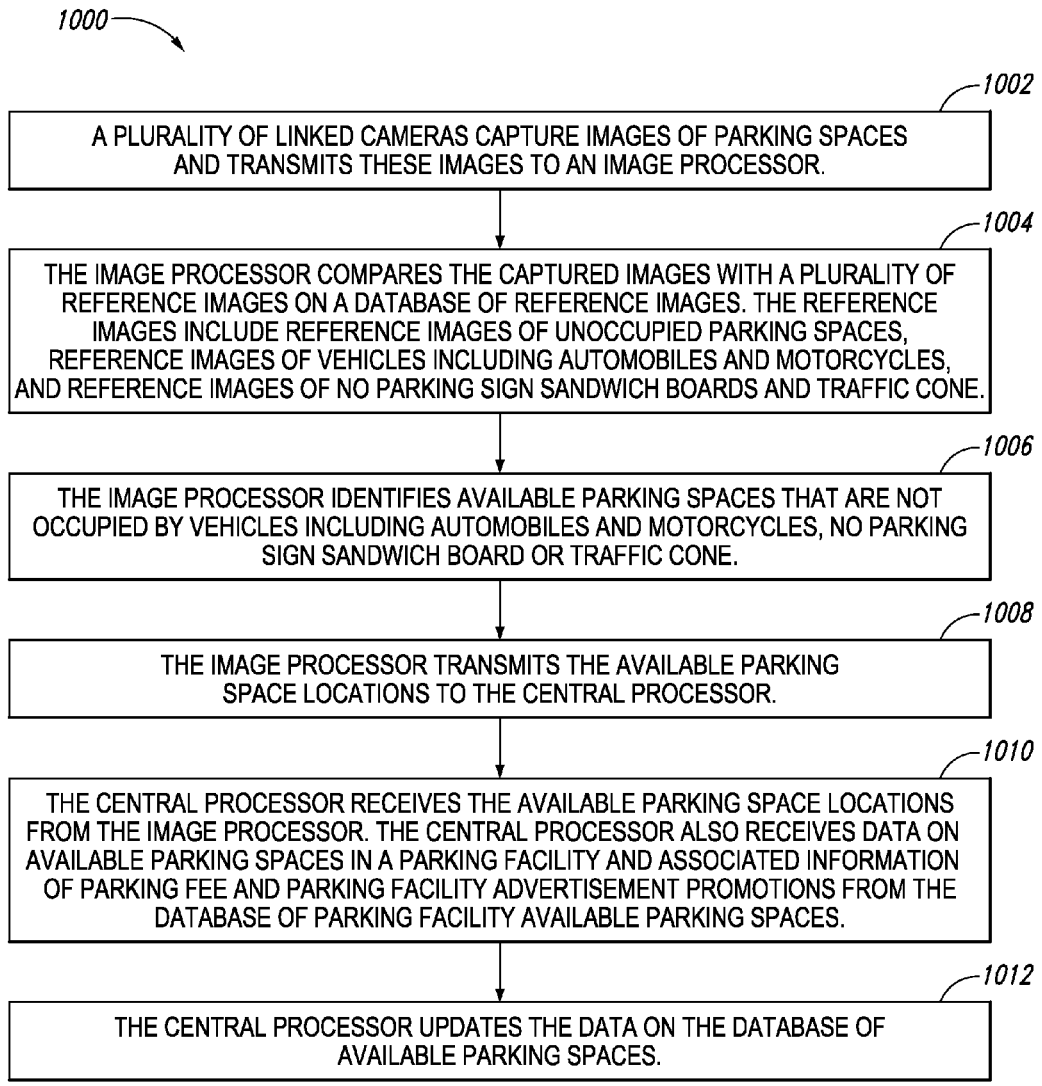
FIG. 10 is an illustration of sequence of operations of linked cameras, image processor and central processor on updating the database of available parking spaces.

Referring to FIG. 10, the sequence of functions and operation 1000 of linked cameras 608, image processor 400, central processor 302, and updating of the database on available parking spaces 304 is detailed.

In step 1002 a plurality of linked cameras 608 capture images of parking spaces 606 and transmits these images to an image processor 400.

In step 1004 the image processor 400 compares the captured images with a plurality of reference images 510 on a database of reference images 500. The reference images 510 include reference images of unoccupied parking spaces 512, reference images of vehicles including automobiles 502 and motorcycles 504, and reference images of no parking sign sandwich boards 506 and traffic cone 508.

In step 1006 the image processor 400 identifies available parking spaces 604 that are not occupied by vehicles including automobiles 502 and motorcycles 504, no parking sign sandwich board 506 or traffic cone 508.

In step 1008 the image processor 400 transmits 402 the available parking space 604 locations to the central processor 302.

In step 1010 the central processor 302 receives 402 the available parking space 604 locations from the image processor 400. The central processor 302 also receives 706 data on available parking spaces 604 in a parking facility 700 and associated information of parking fee and parking facility advertisement promotions from the database 704 of parking facility available parking spaces.

In step 1012 the central processor 302 updates the data on the database of available parking spaces 304.

Figure 11:
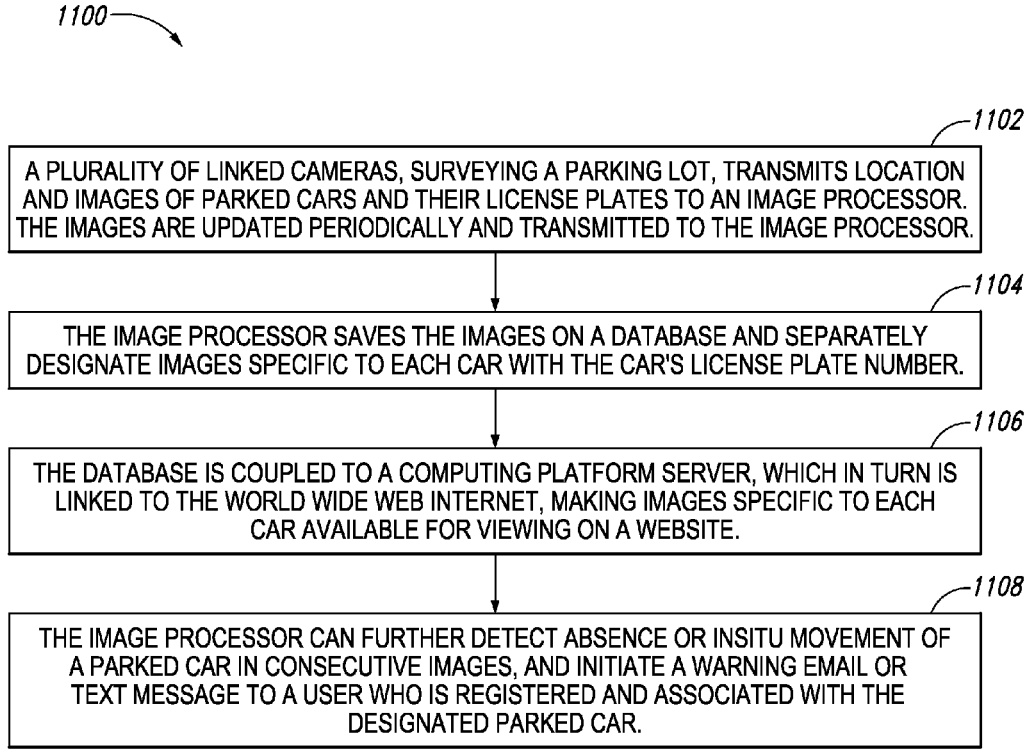
FIG. 11 is an illustration of sequence of functions on surveillance of parked cars.

Referring to FIG. 11, the sequence of functions 1100 on surveillance of parked cars is detailed.

In step 1102 a plurality of linked cameras, surveying a parking lot, transmits location and images of parked cars and their license plates to an image processor. The images are updated periodically and transmitted to the image processor.

In step 1104 the image processor saves the images on a database and separately designate images specific to each car with the car's license plate number.

In step 1106 the database is coupled to a computing platform server, which in turn is linked to the World Wide Web internet, making images specific to each car available for viewing on a website.

In step 1108 the image processor can further detect absence or insitu movement of a parked car in consecutive images, and initiate a warning email or text message to a user who is registered and associated with the designated parked car.

As various modifications could be made in the construction of the apparatus and system and its method of operation herein described and illustrated without departing from the scope of the present disclosure, it is intended that all matter contained in the foregoing description or shown in the accompanying drawings shall be interpreted as illustrative rather than limiting. Thus, the breadth and scope of the present disclosure should not be limited by any of the above described exemplary embodiments, but should be defined only in accordance with the following claims appended hereto and their equivalents.

The invention claimed is:

1. A method, comprising: encoding a computer program comprising a computing platform application on a tangible computer readable medium for performing a sequence of functions on a computing platform including a mobile phone, a tablet, or a personal computer:

a user activating the application, the application transmitting a request for an information on locations of available parking spaces, accommodating a specific size vehicle, proximate to a location of the computing platform, to a central processor comprising hardware and software, the application receiving a transmitted response from the central processor comprising information on real time available parking spaces off a street and an available parking space in a parking facility and associated information including locations and directions to the available parking spaces, a parking $fee_s$ and an advertising promotions of the parking facility proximate to the location of the computing platform, where the available parking spaces are not occupied by an automobile, a bicycle, a motorcycle, a no parking sign sandwich board, or a traffic cone, based on comparison of images from parking spaces with a plurality of reference images in a database of reference images, comprising images of an unoccupied parking space, images of vehicles including a series of automobiles, bicycles, and motorcycles, and reference images of a traffic cone and a no parking sign sandwich board, the application further displaying and / or audio broadcasting the received information on the computing platform, and the user selecting one of the available parking spaces.

2. Method of claim 1, the central processor receiving information on available parking spaces from a system of linked cameras surveying parking spaces off the street and in parking facilities, transferring a plurality of images of the parking spaces to an image processor, the image processor comparing the parking space images with the plurality of reference images in the database of reference images, comprising images of the unoccupied parking space, images of vehicles including the series of automobiles, bicycles, and motorcycles, and reference images of the traffic cone and the no parking sign sandwich board, identifying if the parking space is occupied by the vehicle, the sandwich board, the traffic cone or the parking space is not occupied, the image processor providing information on available parking spaces and their location to the central processor, the central processor further gathering information provided by parking facilities on available parking spaces in the parking facilities, and the central processor updating a parking space database, on a real time basis, with the information on available parking spaces and retrieving the information for responding to the computing platform application inquiry.

3. Method of claim 2, where the information provided by the parking facilities on available parking spaces in the parking facility further includes parking fee and advertising promotions of the parking facility to be transmitted to the computing platform application upon parking facilities' authorizing payment of an advertisement fee.

4. The method of claim 2, the image processor processing parking space images captured in day light, or under limited light, and under clear or adverse atmospheric conditions comprising rain, fog, or snow.

5. Method of claim 1, where the location proximate to the location of the computing platform comprises two locations, first location is a real time present location of the computing platform, and the second location is a future location of the computing platform specified by an address of the future location entered by the user, where the user selects one of the locations.

6. Method of claim 5, the computing platform application further providing a distance information and an estimated travel time on foot, by a car or a shuttle from the user selected available parking space to the future location of the computing platform specified by the user.

7. Method of claim 1, where upon receiving a transmitted response from the central processor identifying the available parking spaces, the user, using the computing platform application, can select and reserve one of the available parking spaces by authorizing payment of a fee, precluding the central processor from responding to another computing platform application inquiry with the reserved available parking space, where upon authorizing payment of the fee the computing platform application transmits a command to the central processor, causing the central processor to designate the reserved parking space as an occupied parking space, and a status of the reserved parking space as the occupied parking space is not updated to the available parking space within a predetermined period of time or a next update of the database of available parking spaces, whichever is last.

8. Method of claim 1, the computing platform application further providing a driving direction to the user selected available parking space from the received transmitted response from the central processor.

9. A system, comprising:
a computing platform including a mobile phone, a tablet, or a personal computer,
a computer program comprising a computing platform application on a tangible computer readable medium for performing a sequence of functions on the computing platform,
a central processor comprising hardware and software,
a database comprising data on available parking spaces,
a database comprising reference images of an unoccupied parking space, images of vehicles including a series of automobiles, bicycles and motorcycles, and reference images of a traffic cone and a no parking sign sandwich board,
a plurality of linked cameras,
an image processor comprising hardware and software, and
where an image from the plurality of linked cameras surveying parking spaces is compared with reference images in the database of references images to identify an available parking space.

10. The system of claim 9, where the central processor is in communication with the computing platform application,
the central processor is linked to a database comprising data on a plurality of available parking spaces on a plurality of street sides, in a plurality of parking facilities and associated information including location of the available parking spaces, any associated parking fee, and the parking facilities' advertising promotions,
the central processor is further in communication with the image processor, and
the central processor is further in communication with a plurality of parking facilities' databases.

11. The system of claim 9, where the image processor is in communication with the plurality of linked cameras,
where the plurality of linked cameras is positioned dominant to a plurality of parking spaces, and
the image processor is further in communication with the database comprising reference images of an unoccupied parking space, images of vehicles including a series of automobiles, bicycles and motorcycles, and reference images of a traffic cone and a no parking sign sandwich board.

12. A business method for providing a driver with real time information on available parking spaces, comprising:
providing the driver a computer program comprising a computing platform application on a tangible computer readable medium for performing a sequence of functions on a computing platform including a mobile phone, a tablet, or a personal computer:
the driver activating the computing platform application, transmitting a request for an information on locations of the available parking spaces, accommodating a specific size vehicle, proximate to a location of the computing platform to a central processor comprising hardware and software,
the computing platform application receiving a transmitted response from the central processor comprising information on real time available parking spaces off the street and available parking spaces in a parking facility and associated information including location and direction to the available parking spaces, parking fee$_s$ and advertising promotions of the parking facility proximate to the location of the computing platform, where the available parking spaces are not occupied by an automobile, a bicycle, a motorcycle, a no parking sign sandwich board, or a traffic cone, based on comparison of images from parking spaces with a plurality of reference images in a database of reference images, comprising images of an unoccupied parking space, images of vehicles including a series of automobiles, bicycles, and motorcycles, and reference images of a traffic cone and a no parking sign sandwich board, the application further displaying and/or audio broadcasting the received information on the computing platform, and the driver selecting one of the available parking spaces.

13. The business method of claim 12, where the location proximate to the location of the computing platform comprises two locations, first location is a real time present location of the computing platform, and the second location is a future location of the computing platform specified by an address of the future location entered by the driver, where the driver selects one of the locations.

14. The business method of claim 12, further providing a plurality of linked cameras surveying a plurality of parking spaces, the linked cameras providing a plurality of images of the parking spaces to an image processor comprising hardware and software, the image processor comparing the images of the parking spaces with the plurality of reference images in the database of reference images, including the unoccupied parking space, vehicles images comprising the series of automobiles, bicycles, and motorcycles and reference images of the no parking sign sandwich board and the traffic cone, the image processor identifying if the parking space is occupied by the vehicle or the sandwich board or the traffic cone or if the parking space is not occupied, and the image processor communicating a plurality of available parking spaces and their locations to the central processor.

15. The business method of claim 14, the image processor processing parking space images captured in day light, or under limited light, and under clear or adverse atmospheric conditions comprising rain, fog, or snow.

16. The business method of claim 12, the central processor updating on a real time basis, an available parking space database with information on the available parking spaces from the image processor and data on available parking spaces and associated information in the parking facilities provided by the parking facilities, and the central processor retrieving available parking spaces information from the available parking space database to transmit a response to the computing platform application inquiry.

17. The business method of claim 12, the driver selecting one of the transmitted available parking spaces, and the computing platform application providing a driving direction to the selected available parking space.

18. The business method of claim 17, the driver further reserving the selected available parking space by authorizing payment of a fee by the computing platform application, precluding the central processor from transmitting the selected available parking space in response to an inquiry by another computing platform application, where upon authorizing payment of the fee, the computing platform application transmits a command to the central processor, causing the central processor to designate the reserved parking space as an occupied parking space, and a status of the reserved parking space as the occupied parking space is not updated to the available parking space within a predetermined period of time or a next update of the database of available parking spaces, whichever is last.

19. The business method of claim 12, where the parking facilities authorize payment of an advertisement fee for the central processor to include the advertising promotions of the parking facilities proximate to the location of the computing platform in the transmitted response.

20. The business method of claim 12, the driver selecting one of the transmitted available parking spaces, and the computing platform application providing a distance information and an estimated travel time on foot, by a car or a shuttle from the driver selected available parking space to the future location of the computing platform specified by the driver.

* * * * *